US012641554B2

(12) United States Patent
Liu

(10) Patent No.: US 12,641,554 B2
(45) Date of Patent: May 26, 2026

(54) METHOD FOR TRANSMITTING A SHARED TRACKING REFERENCE SIGNAL (TRS)/CHANNEL STATE INFORMATION-REFERENCE SIGNAL (CSI-RS), COMMUNICATION DEVICE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 376 days.

(21) Appl. No.: 18/267,718

(22) PCT Filed: Dec. 17, 2020

(86) PCT No.: PCT/CN2020/137346
§ 371 (c)(1),
(2) Date: Jun. 15, 2023

(87) PCT Pub. No.: WO2022/126546
PCT Pub. Date: Jun. 23, 2022

(65) Prior Publication Data
US 2024/0073836 A1 Feb. 29, 2024

(51) Int. Cl.
*H04W 56/00* (2009.01)
*H04W 68/00* (2009.01)

(52) U.S. Cl.
CPC ....... *H04W 56/001* (2013.01); *H04W 68/005* (2013.01)

(58) Field of Classification Search
None
See application file for complete search history.

(56) References Cited

U.S. PATENT DOCUMENTS

2023/0388077 A1* 11/2023 Maleki .................. H04W 76/27
2023/0388968 A1* 11/2023 Yang ................... H04W 68/025

FOREIGN PATENT DOCUMENTS

CN 110167107 A 8/2019

OTHER PUBLICATIONS

European Patent Application No. 20965562.0, Search and Opinion dated Feb. 2, 2024, 12 pages.
OPPO "Further discussion on Paging enhancements for power saving" 3GPP TSG RAN WG1 #103-e, R1-2008265, Oct.-Nov. 2020, 6 pages.

(Continued)

*Primary Examiner* — Saad Khawar
(74) *Attorney, Agent, or Firm* — Cozen O'Connor

(57) ABSTRACT

A method for transmitting information, includes: sending a shared tracking reference signal (TRS)/channel state information-reference signal (CSI-RS), in which the shared TRS/CSI-RS is at least configured for at least one of a user equipment (UE) in an idle state and a UE in an inactive state to complete downlink synchronization and receive a paging early indication (PEI), and the PEI is carried in downlink control information (DCI). The method may also include sending first indication information, wherein the first indication information is configured for the UE to determine whether to complete the downlink synchronization and receive the PEI via the shared TRS/CSI-RS.

16 Claims, 4 Drawing Sheets

(56)                References Cited

OTHER PUBLICATIONS

Samsung "Moderator summary for TRSCSI-RS occasion(s)for idle/inactive UEs" 3GPP TSG RAN WG1 #103-e, R1-2008178, Oct.-Nov. 2020, 52 pages.

Mediatek "Summary for Potential Paging Enhancements" 3GPP TSG RAN WG1 #103 e-Meeting, R1-2009753, Oct.-Nov. 2020, 87 pages.

PCT/CN2020/137346, English translation of International Search Report dated Jun. 15, 2021, 3 pages.

Samsung "Discussion on TRS/CSI-RS for idle/inactive UEs" 3GPP TSG RAN WG1 #103, R1-2008176, Nov. 2020, 6 pages.

LG Electronics "Discussion on TRS/CSI-RS occasion(s) for idle/inactive UEs" 3GPP TSG RAN WG1 #103-e, R1-2008054, Nov. 2020, 5 pages.

NTT DOCOMO, Inc. "Discussion on TRS/CSI-RS occasion for idle/inactive UEs " 3GPP TSG RAN WG1 #103-e, R1-2009188, Nov. 2020, 3 pages.

* cited by examiner

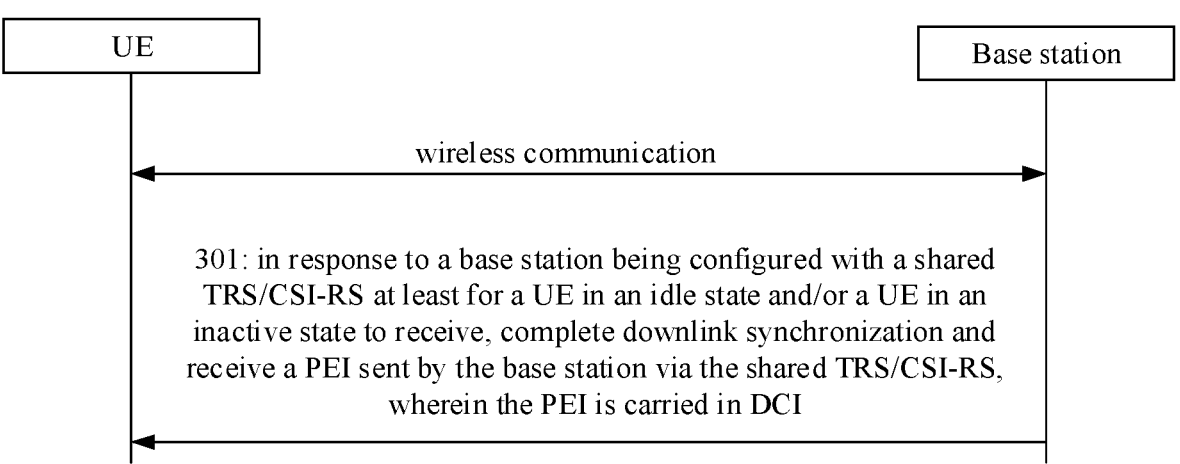

301: in response to a base station being configured with a shared TRS/CSI-RS at least for a UE in an idle state and/or a UE in an inactive state to receive, complete downlink synchronization and receive a PEI sent by the base station via the shared TRS/CSI-RS, wherein the PEI is carried in DCI

FIG. 3 apparatus for transmitting information 100 first sending module 110 second sending module 120 third sending module 130 first sending sub-module 131 second sending sub-module 132 third sending sub-module 133 fourth sending module 140 fifth sending sub-module 141 sixth sending sub-module 142

FIG. 4

METHOD FOR TRANSMITTING A SHARED TRACKING REFERENCE SIGNAL (TRS)/CHANNEL STATE INFORMATION-REFERENCE SIGNAL (CSI-RS), COMMUNICATION DEVICE, AND STORAGE MEDIUM

CROSS-REFERENCE TO RELATED APPLICATION

This application is a U.S. national phase of International Application No. PCT/CN2020/137346, filed on Dec. 17, 2020, the entire content of which is incorporated herein by reference.

TECHNICAL FIELD

The disclosure relates to the communication networks including wireless communication networks, in particular to a method for transmitting information, a communication device and a storage medium.

BACKGROUND

In a 5th Generation (5G) cellular mobile communication system, a process of receiving a paging message by a user equipment (UE) includes: detecting a physical downlink control channel (PDCCH) in a search space corresponding to a paging occasion (PO), obtaining downlink control information (DCI) carrying paging scheduling information through analysis, and in response to the DCI being successfully analyzed, receiving and demodulating the paging message using a physical downlink shared channel (PDSCH) resource based on scheduling of the paging scheduling information. For a UE working with discontinuous reception (DRX) mechanism, if an ID of a received paging message belongs to the UE itself, it initiates a connection, otherwise it continues to sleep. If no DCI is analyzed, it means that there is no paging message in a wakeup (DRX_on) cycle.

SUMMARY

According to a first aspect of the embodiments of the disclosure, a method for transmitting information, applicable to a base station, is provided. The method includes:

sending a shared tracking reference signal (TRS)/channel state information-reference signal (CSI-RS), in which the shared TRS/CSI-RS is at least configured for a user equipment (UE) in an idle state and/or a UE in an inactive state to complete downlink synchronization and receive a paging early indication (PEI), and the PEI is carried in downlink control information (DCI).

According to a second aspect of the embodiments of the disclosure, a method for transmitting information, applicable to a UE, is provided. The method includes:

in response to a base station being configured with a shared TRS/CSI-RS at least for a UE in an idle state and/or a UE in an inactive state to receive, completing downlink synchronization and receiving a PEI sent by the base station via the shared TRS/CSI-RS, in which the PEI is carried in DCI.

According to a third aspect of the embodiments of the disclosure, a communication device including a processor, a memory and executable programs stored on the memory and capable of being run by the processor is provided. When the executable programs are executed by the processor, the steps of the method for transmitting information according to the first aspect or the second aspect are implemented.

According to a fourth aspect of the embodiments of the disclosure, a storage medium having executable programs stored thereon is provided. When the executable programs are executed by a processor, the steps of the method for transmitting information according to the first aspect or the second aspect are implemented.

It should be understood that the above general description and the following detailed descriptions are exemplary and explanatory only and do not limit the embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the embodiments of the disclosure.

FIG. 3 is a flowchart of a method for transmitting information, performed by a user equipment (UE) according to another exemplary embodiment.

FIG. 4 is a block diagram of an apparatus for transmitting information according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the embodiments of the disclosure are only for the purpose of describing specific embodiments, and are not intended to limit the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information.

Depending on the context, the term "if" as used herein can be interpreted as "when", "while" or "in response to determining".

Figure 1:
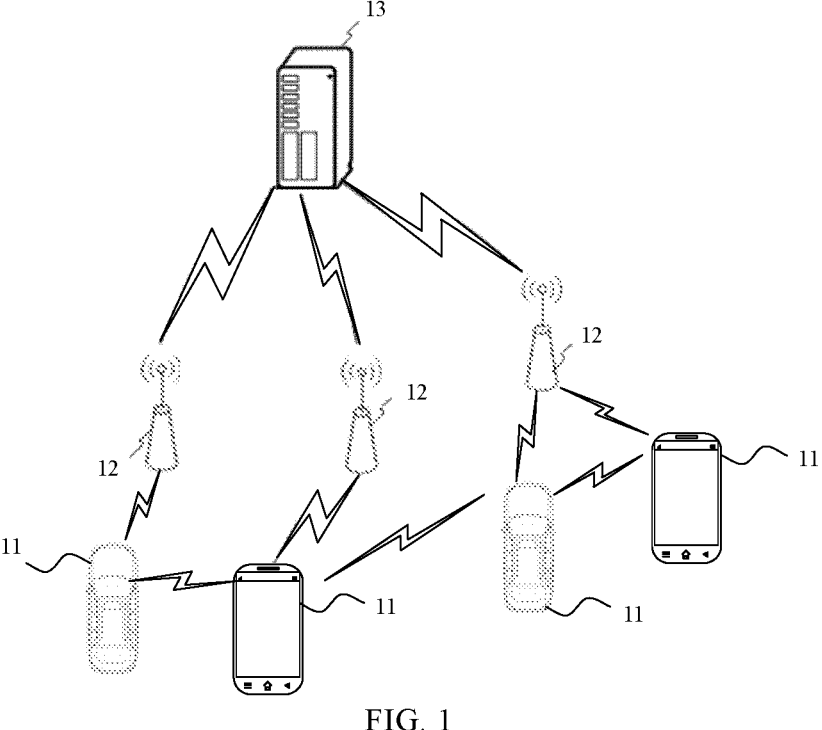
FIG. 1 is a schematic diagram of a wireless communication system according to an exemplary embodiment.

FIG. 1 is a schematic diagram of a wireless communication system according to an embodiment of the disclosure. As illustrated in FIG. 1, the wireless communication system is a communication system based on the cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a cell phone (or "cellular" phone), and a computer with the IoT terminal. For example, the terminal 11 may be a stationary, portable, pocket-sized, handheld, computer-built in, or vehicle-mounted device, such as, a station (STA), a subscriber unit, a subscriber station, a mobile station, a mobile, a remote station, an access point, a remote terminal, an access terminal, a user terminal, a user agent, a user device, or a UE. Alternatively, the terminal 11 may be an unmanned aerial vehicle device. Alternatively, the terminal 11 may be an in-vehicle device, for example, an Electronic Control Unit (ECU) having wireless communication function, or a wireless communication device externally connected to the ECU. Alternatively, the terminal 11 can also be a roadside device, for example, a street light, a signal light, or other roadside devices having the wireless communication function.

The base station 12 may be a network side device in the wireless communication system. The wireless communication system may be the 4th Generation (4G) mobile communication system, also known as a Long Term Evolution (LTE) system. Alternatively, the wireless communication system may also be a 5G system, also known as a New Radio (NR) system or a 5G NR system. Alternatively, the wireless communication system may be any next-generation system of the 5G system. The access network in the 5G system may be called a New Generation-RAN (NG-RAN) or a machine type communication (MTC) system.

The base station 12 can be an evolved base station (eNB) employed in the 4G system. Alternatively, the base station 12 may be a base station (gNB) with a centralized distributed architecture employed in the 5G system. When the base station 12 adopts a centralized distributed architecture, it usually includes a Central Unit (CU) and at least two Distributed Units (DUs). The CU is equipped with protocol stacks of a Packet Data Convergence Protocol (PDCP) layer, a Radio Link Control (RLC) layer, and a Media Access Control (MAC) layer. The DU is equipped with a protocol stack of a physical (PHY) layer, and the specific implementation of the base station 12 is not limited in the embodiments of this disclosure.

A wireless connection can be established between the base station 12 and the terminal 11 via a radio interface. In different implementations, the radio interface is a radio interface based on the 4G standard. Alternatively, the radio interface is a radio interface based on the 5G standard, for example, the radio interface is a NR. Alternatively, the radio interface may also be a radio interface based on a standard of the next generation of the 5G.

In some embodiments, an End to End (E2E) connection can also be established between the terminals 11 such as, Vehicle to Vehicle (V2V) communication, Vehicle to Infrastructure (V2I) communication, and Vehicle to Pedestrian (V2P) communication in Vehicle to Everything (V2X) communication scenario.

In some embodiments, the above wireless communication system may also include a network management device 13.

The plurality of base stations 12 are connected to the network management device 13 respectively. The network management device 13 may be a core network device in the wireless communication system, for example, a Mobility Management Entity (MME) in an Evolved Packet Core (EPC) network. Alternatively, the network management device may be another core network devices, such as a Serving Gate Way (SGW), a Public Data Network Gate Way (PGW), a Policy and Charging Rules Function (PCRF), or a Home Subscriber Server (HSS), etc. The implementation form of the network management device 13 is not limited in the embodiments of the disclosure.

Execution objects involved in the embodiments of the disclosure include, but are not limited to, UEs such as cell phone terminals that support cellular mobile communication, and base stations, etc.

An application scenario of an embodiment of the disclosure is that in the related art, a UE in an idle state and a UE in an inactive state can share tracking reference signal/channel state information-reference signal (TRS/CSI-RS) configuration with a UE in a connected state, i.e., the UE in an idle state and the UE in an inactive state can use a shared TRS/CSI-RS.

The UE in a connected state uses TRS/CSI-RS to actually face a cell or a group of UEs, so the TRS/CSI-RS configuration does not take into account a relation with a paging occasion (PO).

In the related art, if the UE is not located at the center of the cell, it can perform synchronization by receiving synchronization signal and physical broadcast channel blocks (SSBs) of 3 cycles.

If the UE is aware of a configured TRS/CSI RS, it can perform synchronization by receiving an SSB of one cycle.

A paging early indication (PEI) may be introduced. The PEI may be based on downlink control information (DCI), and its location is configured by the base station, such as it may be configured to be located 1-3 SSBs in front of the PO.

Figure 2:
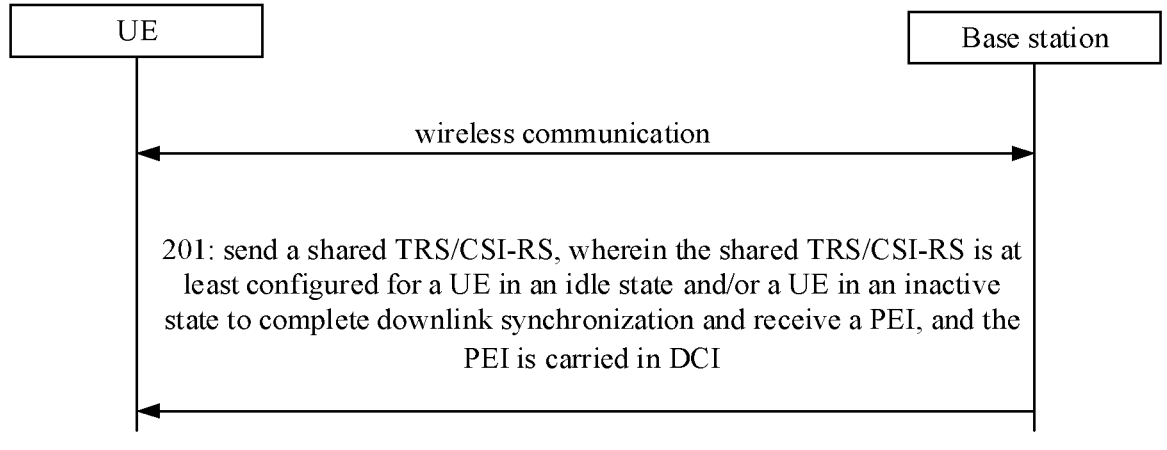
FIG. 2 is a flowchart of a method for transmitting information, performed by a base station according to an exemplary embodiment.

As illustrated in FIG. 2, an exemplary embodiment provides a method for transmitting information, which may be applicable to a base station in a cellular mobile communication system. The method includes the following steps.

At step 201, a shared TRS/CSI-RS is sent, in which the shared TRS/CSI-RS is at least configured for a UE in an idle state and/or a UE in an inactive state to complete downlink synchronization and receive a PEI, and the PEI is carried in DCI.

The UE may be a cell phone terminal that uses the cellular mobile communication technology for wireless communication. The base station may be a communication device that provides an access network interface to the UE in the cellular mobile communication system.

The TRS/CSI-RS can be used for the UE to obtain a status, beam management, mobility management and rate matching of a channel.

Frequencies of physical crystal oscillators of the UE and the base station may have a small deviation, and they are impossible to achieve complete consistency, so that a radio frequency (RF) carrier signal received by the UE may have a phase deviation, which is expressed as a rotation in phase in a demodulation symbol constellation diagram of received subcarriers. That is, a received modulation symbol deviates for a certain phase angle, which is caused by the accumulation of frequency deviation in time. At this time, a tracking reference signal (TRS) is may be tracked to track rotational phases of other data signals. The TRS is a multi-cycle TRS/CSI-RS, precisely a non-zero power TRS/CSI-RS (NZP-TRS/CSI-RS) with a 4-1 port and 3 TRS/CSI-RS densities, and located in two consecutive time slots. A minimum interval between two TRSs in time within one time slot is 4 Orthogonal Frequency Division Multiplexing (OFDM) symbols, and 4 subcarriers in the frequency domain. Errors in the frequency domain and in the time domain can be estimated based on the TRS. If the received data compensates for these errors, it can be rotated back to a modulation coordinate position as originally sent.

The shared TRS/CSI-RS may be TRS/CSI-RS shared by the UE in the idle state and/or the UE in the inactive state with the UE in the connected state. The UE in the idle state and/or the UE in the inactive state, and the UE in the connected state can monitor the TRS/CSI-RS at an occasion of sharing the TRS/CSI-RS.

The shared TRS/CSI-RS can also be used by the UE for downlink synchronization with the base station. The UE can receive a downlink signal from the base station after the downlink synchronization is completed.

The PEI is sent by the base station to the UE in the idle state and/or the UE in the inactive state, and can be used to indicate whether the UE monitors the PO, etc.

The PEI can be carried in the DCI. The UE may perform downlink synchronization when receiving the PEI. The UE can complete the downlink synchronization through 3 SSB cycles.

The UE can complete the downlink synchronization and receive the PEI carried in the DCI via the shared TRS/CSI-RS. When the UE completes the downlink synchronization and receives the PEI carried in the DCI via the shared TRS/CSI-RS, it can reduce the case that the UE performs downlink synchronization again using the SSB.

The shared TRS/CSI-RS is usually located in 1 SSB cycle. The UE can complete the downlink synchronization in 1 SSB cycle.

The time domain locations of the PEI and the shared TRS/CSI-RS can be configured flexibly, and the PEI can be configured to be close to the shared TRS/CSI-RS, so that a wakeup duration of the UE can be reduced, and the PEI can be received in a relatively short period of time after the downlink synchronization based on the shared TRS/CSI-RS is completed, thereby reducing the power consumption increase due to a long wakeup duration of UE.

In this way, the downlink synchronization is completed and the PEI sent by the base station is received through the shared TRS/CSI-RS. On the one hand, the UE can complete the downlink synchronization and receive the PEI by the TRS/CSI-RS, no longer needing 3 SSB cycles for downlink synchronization, which reduces synchronization power consumption. On the other hand, the base station can flexibly configure the time domain locations of the PEI and the shared TRS/CSI-RS, shortening the wakeup duration of UE from performing the downlink synchronization to receiving the PEI, thereby reducing the UE power consumption and increasing the standby time.

In an embodiment, the method further includes:
sending first indication information, in which the first indication information is configured for the UE to determine whether to complete the downlink synchronization and receive the PEI via the shared TRS/CSI-RS.

The base station can indicate, by means of the first indication information, whether the DCI-based PEI can perform synchronization via the shared TRS/CSI-RS.

The first indication information may be carried in a downlink signaling such as a RRC message and sent to the UE.

After receiving the first indication information, the UE can determine whether to use the shared TRS/CSI-RS for synchronization and receive the PEI based on the synchronization.

In an embodiment,
in response to the first indication information indicating a first value, the first indication information is configured to indicate the UE to complete the downlink synchronization and receive the PEI sent by the base station via the shared TRS/CSI-RS; and
in response to the first indication information indicating a second value, the first indication information is configured to indicate the UE to complete the downlink synchronization via a SSB and to receive the PEI sent by the base station, in which the first value is different from the second value.

The first indication information can represent at least two values, i.e., the first value and the second value. For example, the first indication information may occupy 1 bit, using "0" to indicate receiving the PEI by using the shared TRS/CSI-RS to perform the synchronization, and using "1" to indicate receiving the PEI by not using the shared TRS/CSI-RS to perform the synchronization. Alternatively, "1" may be used to indicate receiving the PEI by using the shared TRS/CSI-RS to perform the synchronization, and "0" may be used to indicate receiving the PEI by not using the shared TRS/CSI-RS.

If the first indication information indicates the first value, the UE uses the shared TRS/CSI-RS for the synchronization, and then receives the PEI based on the synchronization.

If the first indication information indicates the second value, the UE may use a method in the related art (i.e., using the SSB) for the synchronization, and then receives the PEI based on the synchronization performed using the SSB.

In an embodiment, the method further includes:
sending the PEI during a SSB cycle associated with the shared TRS/CSI-RS.

When configuring the PEI, the base station can configure the PEI to a location that is close to a location of the shared TRS/CSI-RS on the time domain. For example, the PEI can be configured to in a SSB cycle close to the shared TRS/CSI-RS on the time domain.

In this way, the UE can receive the PEI in a short period of time after completing the synchronization via the shared TRS/CSI-RS, thereby reducing the wakeup duration of the UE and reducing the UE power consumption.

In an embodiment, sending the PEI during the SSB cycle associated with the shared TRS/CSI-RS includes at least one of:
sending the PEI during a SSB cycle to which the shared TRS/CSI-RS belongs; and
sending the PEI during a SSB cycle that is at a preset distance from the shared TRS/CSI-RS in the time domain.

For example, the PEI can be configured to the same SSB cycle where the shared TRS/CSI-RS is located.

When the UE uses the shared TRS/CSI-RS for the synchronization, the PEI reception can be completed in the same SSB cycle.

The PEI can be configured to be within 1 or 2 SSB cycles close to the shared TRS/CSI-RS. If the 1 SSB closest to the TRS/CSI-RS is not available, the PEI is configured to the next closest SSB.

In an embodiment, sending the PEI during the SSB cycle associated with the shared TRS/CSI-RS, includes:

in response to the first indication information indicating a first value, sending the PEI during the SSB cycle associated with the shared TRS/CSI-RS.

When the first indication information indicates the first value, the base station may configure the PEI to be within the SSB cycle associated with the shared TRS/CSI-RS. That is, when the first indication information indicates the first value, it is implicitly indicated that the PEI is configured to be within the SSB cycle associated with the shared TRS/CSI-RS.

When the first indication information indicates the first value, the UE receives the PEI in the SSB cycle associated with the shared TRS/CSI-RS after completing the synchronization via the shared TRS/CSI-RS. Otherwise, the SSB is used for the synchronization and PEI reception.

In an embodiment, the method further includes:

sending configuration information carrying the first indication information and second indication information for indicating a transmission resource of the shared TRS/CSI-RS.

The base station may carry the first indication information and the second indication information for indicating the transmission resource of the shared TRS/CSI-RS in the same downlink message to send to the UE.

The UE may receive the first indication information and the second indication information simultaneously, complete downlink synchronization via the shared TRS/CSI-RS transmitted by the transmission resource, and receive the PEI based on the completed downlink synchronization.

In an embodiment, sending the configuration information carrying the first indication information and the second indication information for indicating the transmission resource of the shared TRS/CSI-RS, includes at least one of:

sending a system message carrying the first indication information and the second indication information; and sending an RRC message carrying the first indication information and the second indication information.

The first indication information and the second indication information may be carried in the system message and/or the RRC message.

The first indication information and the second indication information may occupy reserved bits in the system message and/or the RRC message, so that the amount of information carried in the system message and/or the RRC message is increased and the efficiency of utilization of the system message and/or the RRC message is improved.

A new system message and/or a new RRC message may also be generated to carry the first indication information and the second indication information.

As shown in FIG. 3, this exemplary embodiment provides a method for transmitting information, which is applicable to a UE in a cellular mobile communication system. The method includes the following steps.

At step 301, in response to a base station being configured with a shared TRS/CSI-RS at least for a UE in an idle state and/or a UE in an inactive state to receive, downlink synchronization is completed via the shared TRS/CSI-RS and a PEI sent by the base station is received, in which the PEI is carried in DCI.

The UE may be a cell phone terminal that uses the cellular mobile communication technology for wireless communication. The base station may be a communication device that provides an access network interface to the UE in the cellular mobile communication system.

The TRS/CSI-RS can be used for the UE to obtain a status, beam management, mobility management and rate matching of a channel.

Frequencies of physical crystal oscillators of the UE and the base station may have a small deviation, and they are impossible to achieve complete consistency, so that an RF carrier signal received by the UE may have a phase deviation, which is expressed as a rotation in phase in a demodulation symbol constellation diagram of received subcarriers. That is, a received modulation symbol deviates for a certain phase angle, which is caused by the accumulation of frequency deviation in time. At this time, a TRS may be tracked to track rotational phases of other data signals. The TRS is a multi-cycle TRS/CSI-RS, precisely a TRS/CSI-RS (NZP-TRS/CSI-RS) with a 4-1 port and 3 TRS/CSI-RS densities, and located in two consecutive time slots. A minimum interval between two TRSs in time within one time slot is 4 OFDM symbols, and 4 subcarriers in the frequency domain. Errors in the frequency domain and in the time domain can be estimated based on the TRS. If the received data compensates for these errors, it can be rotated back to a modulation coordinate position as originally sent.

The shared TRS/CSI-RS may be TRS/CSI-RS shared by the UE in the idle state and/or the UE in the inactive state with the UE in the connected state. The UE in the idle state and/or the UE in the inactive state, and the UE in the connected state can monitor the TRS/CSI-RS at an occasion of sharing the TRS/CSI-RS.

The shared TRS/CSI-RS can also be used by the UE for downlink synchronization with the base station. The UE can receive a downlink signal from the base station after the downlink synchronization is completed.

The PEI is sent by the base station to the UE in the idle state and/or the UE in the inactive state and can be used to indicate whether the UE monitors the PO, etc.

The PEI can be carried in the DCI. The UE may perform downlink synchronization when receiving the PEI. The UE can complete the downlink synchronization in 3 SSB cycles.

The UE can complete the downlink synchronization and receive the PEI carried in the DCI via the shared TRS/CSI-RS. When the UE completes the downlink synchronization and receives the PEI carried in the DCI via the shared TRS/CSI-RS, it can reduce the case that the UE performs downlink synchronization again using the SSB.

The shared TRS/CSI-RS is usually located in 1 SSB cycle. The UE can complete the downlink synchronization in 1 SSB cycle.

The time domain locations of the PEI and the shared TRS/CSI-RS can be configured flexibly, and the PEI can be configured to be close to the shared TRS/CSI-RS, so that a wakeup duration of the UE can be reduced, and the PEI can be received in a relatively short period of time after the downlink synchronization based on the shared TRS/CSI-RS is completed, thereby reducing the power consumption increase due to a long wakeup duration of UE.

In this way, the downlink synchronization is completed and the PEI sent by the base station is received through the shared TRS/CSI-RS. On the one hand, the UE can complete the downlink synchronization and receive the PEI by the TRS/CSI-RS, no longer needing 3 SSB cycles for downlink synchronization, which reduces synchronization power consumption. On the other hand, the base station can flexibly configure the time domain locations of the PEI and the shared TRS/CSI-RS, to shorten the wakeup duration of UE from performing the downlink synchronization to PEI reception, thereby reducing the UE power consumption and increasing the standby time.

In an embodiment, the method further includes:

receiving first indication information; and determining, based on the first indication information, whether to complete the downlink synchronization and receive the PEI sent by the base station via the shared TRS/CSI-RS.

The base station can indicate, by means of the first indication information, whether the DCI-based PEI can perform synchronization via the shared TRS/CSI-RS.

The first indication information may be carried in a downlink signaling such as a RRC message and sent to the UE.

After receiving the first indication information, the UE can determine whether to use the shared TRS/CSI-RS for synchronization and receive the PEI reception based on the synchronization.

In an embodiment, determining, based on the first indication information, whether to complete the downlink synchronization and receive the PEI sent by the base station via the shared TRS/CSI-RS, includes at least one of:

in response to the first indication information indicating a first value, completing the downlink synchronization and receiving the PEI sent by the base station via the shared TRS/CSI-RS; and in response to the first indication information indicating a second value, completing the downlink synchronization via a SSB and receiving the PEI sent by the base station, in which the first value is different from the second value.

The first indication information can represent at least two values, i.e., the first value and the second value. For example, the first indication information may occupy 1 bit, using "0" to indicate receiving the PEI by using the shared TRS/CSI-RS to perform the synchronization, and using "1" to indicate receiving the PEI by not using the shared TRS/CSI-RS to perform the synchronization. Alternatively, "1" may be used to indicate receiving the PEI by using the shared TRS/CSI-RS to perform the synchronization, and "0" may be used to indicate receiving the PEI by not using the shared TRS/CSI-RS.

If the first indication information indicates the first value, the UE uses the shared TRS/CSI-RS for the synchronization and then receives the PEI based on the synchronization.

If the first indication information indicates the second value, the UE may use a method in the related art (i.e., using the SSB) for the synchronization, and then receives the PEI based on the synchronization performed using the SSB.

In an embodiment, completing the downlink synchronization and receiving the PEI sent by the base station via the shared TRS/CSI-RS, includes:

completing the downlink synchronization and receiving the PEI sent during a SSB cycle associated with the shared TRS/CSI-RS by the base station via the shared TRS/CSI-RS.

When configuring the PEI, the base station can configure the PEI to a location that is close to a location of the shared TRS/CSI-RS on the time domain. For example, the PEI can be configured to in a SSB cycle close to the shared TRS/CSI-RS on the time domain.

In this way, the UE can receive the PEI in a short period of time after completing the synchronization via the shared TRS/CSI-RS, thereby reducing the wakeup duration of the UE and reducing the UE power consumption.

In an embodiment, receiving the PEI sent during the SSB cycle associated with the shared TRS/CSI-RS by the base station includes at least one of:

receiving the PEI during a SSB cycle to which the shared TRS/CSI-RS belongs; and receiving the PEI during a SSB cycle that is at a preset distance from the shared TRS/CSI-RS in the time domain.

For example, the PEI can be configured to the same SSB cycle where the shared TRS/CSI-RS is located.

When the UE uses the shared TRS/CSI-RS for the synchronization, the PEI reception can be completed in the same SSB cycle.

The PEI can be configured to be within 1 or 2 SSB cycles close to the shared TRS/CSI-RS. If the 1 SSB closest to the TRS/CSI-RS is not available, the PEI is configured to the next closest SSB.

In an embodiment, completing the downlink synchronization and receiving the PEI sent during the SSB cycle associated with the shared TRS/CSI-RS by the base station via the shared TRS/CSI-RS, includes:

in response to the first indication information indicating a first value, receiving the PEI sent during the SSB cycle associated with the shared TRS/CSI-RS by the base station.

When the first indication information indicates the first value, the base station may configure the PEI to be within the SSB cycle associated with the shared TRS/CSI-RS. That is, when the first indication information indicates the first value, it is implicitly indicated that the PEI is configured to be within the SSB cycle associated with the shared TRS/CSI-RS.

When the first indication information indicates the first value, the UE receives the PEI in the SSB cycle associated with the shared TRS/CSI-RS after completing the synchronization via the shared TRS/CSI-RS. Otherwise, the SSB is used for the synchronization and PEI reception.

In an embodiment, the method further includes:

receiving configuration information carrying the first indication information and second indication information for indicating a transmission resource of the shared TRS/CSI-RS; and completing the downlink synchronization and receiving the PEI sent by the base station via the shared TRS/CSI-RS, including:

completing the downlink synchronization and receiving the PEI sent by the base station via the shared TRS/CSI-RS transmitted by the transmission resource.

The base station may carry the first indication information and the second indication information for indicating the transmission resource of the shared TRS/CSI-RS in the same downlink message to send to the UE.

The UE may receive the first indication information and the second indication information simultaneously, and complete the downlink synchronization via the shared TRS/CSI-RS transmitted by the transmission resource, and receive the PEI based on the completed downlink synchronization.

In an embodiment, receiving the configuration information carrying the first indication information and the second indication information for indicating the transmission resource of the shared TRS/CSI-RS, includes at least one of:

receiving a system message carrying the first indication information and the second indication information; and receiving an RRC message carrying the first indication information and the second indication information.

The first indication information and the second indication information may be carried in the system message and/or the RRC message.

The first indication information and the second indication information may occupy reserved bits in the system message and/or the RRC message, so that the amount of information carried in the system message and/or the RRC message is increased and the efficiency of utilization of the system message and/or the RRC message is improved.

A new system message and/or a new RRC message may also be generated to carry the first indication information and the second indication information.

With the method for transmitting information, the apparatus for transmitting information, the communication device and the storage medium according to the embodiments of the disclosure, the base station sends the shared TRS/CSI-RS, the shared TRS/CSI-RS is at least configured for the UE in an idle state and/or the UE in an inactive state to complete the downlink synchronization and receive the PEI, and the PEI is carried in the DCI. In this way, the downlink synchronization is completed and the PEI sent from the base station is received via the shared TRS/CSI-RS. On the one hand, the UE can use the TRS/CSI-RS to complete downlink synchronization and receive the PEI, no longer needing three SSB cycles for downlink synchronization, which reduces the synchronization power consumption. On the other hand, the base station can flexibly configure the time domain locations of the PEI and the shared TRS/CSI-RS, shortening a wakeup duration of the UE from performing the downlink synchronization to receiving the PEI, thereby reducing the UE power consumption and increasing the standby duration.

A specific example is provided below with reference to any of the above embodiments.

1. After the introduction of a DCI-based PEI, the UE, when waking up, may perform synchronization for receiving the DCI-based PEI itself, because the PEI is earlier than paging. This reference signal can be used for fast synchronization if the base station is configured with a shared TRS/CSI-RS.

2. A switch value is introduced to represent whether the DCI-based PEI can perform the fast synchronization using the shared TRS/CSI-RS.

3. The UE determines a strategy for performing the synchronization before receiving the PEI based on the switch value.

4. If the switch is 0, the UE uses a SSB for synchronization.

5. If the switch is 1, the TRS/CSI-RS is used for the synchronization.

6. If the switch is 1, the base station configures the PEI in the nearest and possible SSB cycle of the shared TRS/CSI-RS, or configures it to the next closest SSB cycle if the nearest one is not available.

7. The above switch values and the shared TRS/CSI-RS are carried in the same configuration information, such as a system message or other RRC messages.

8. The above switch can be implicitly associated with a switch of the shared TRS/CSI-RS indicated by the system. That is, if the system indicates that the shared TRS/CSI-RS is on, the system may configure a time domain relation between the DCI-based PEI and the shared TRS/CSI-RS according to the above principles.

The embodiment of the disclosure also provides an apparatus 100 for transmitting information, applicable to a base station for wireless communication. As illustrated in FIG. 4, the apparatus 100 includes: a first sending module 110.

The first sending module 110 is configured to send a shared TRS/CSI-RS, in which the shared TRS/CSI-RS is at least configured for a UE in an idle state and/or a UE in an inactive state to complete downlink synchronization and receive a PEI, and the PEI is carried in DCI.

In an embodiment, the apparatus 100 further includes:

a second sending module 120, configured to send first indication information, in which the first indication information is configured for the UE to determine whether to complete the downlink synchronization and receive the PEI via the shared TRS/CSI-RS.

In an embodiment, in response to the first indication information indicating a first value, the first indication information is configured to indicate the UE to complete the downlink synchronization and receive a PEI sent by the base station via the shared TRS/CSI-RS; and in response to the first indication information indicating a second value, the first indication information is configured to indicate the UE to complete the downlink synchronization and receive the PEI sent by the base station via a SSB, in which the first value is different from the second value.

In an embodiment, the apparatus 100 further includes:

a third sending module 130, configured to send the PEI during a SSB cycle associated with the shared TRS/CSI-RS.

In an embodiment, the third sending module 130 includes at least one of:

a first sending sub-module 131, configured to send the PEI during a SSB cycle to which the shared TRS/CSI-RS belongs; and a second sending sub-module 132, configured to send the PEI during a SSB cycle that is at a preset distance from the shared TRS/CSI-RS in a time domain.

In an embodiment, the third sending module 130 includes:

a third sending sub-module 133, configured to, in response to the first indication information indicating a first value, send the PEI during the SSB cycle associated with the shared TRS/CSI-RS.

In an embodiment, the apparatus 100 further includes:

a fourth sending module 140, configured to send configuration information carrying the first indication information and second indication information for indicating a transmission resource of the shared TRS/CSI-RS.

In an embodiment, the fourth sending module 140 includes at least one of:

a fifth sending sub-module 141, configured to send a system message carrying the first indication information and the second indication information; and a sixth sending sub-module 142, configured to send a RRC message carrying the first indication information and the second indication information.

Figure 5:
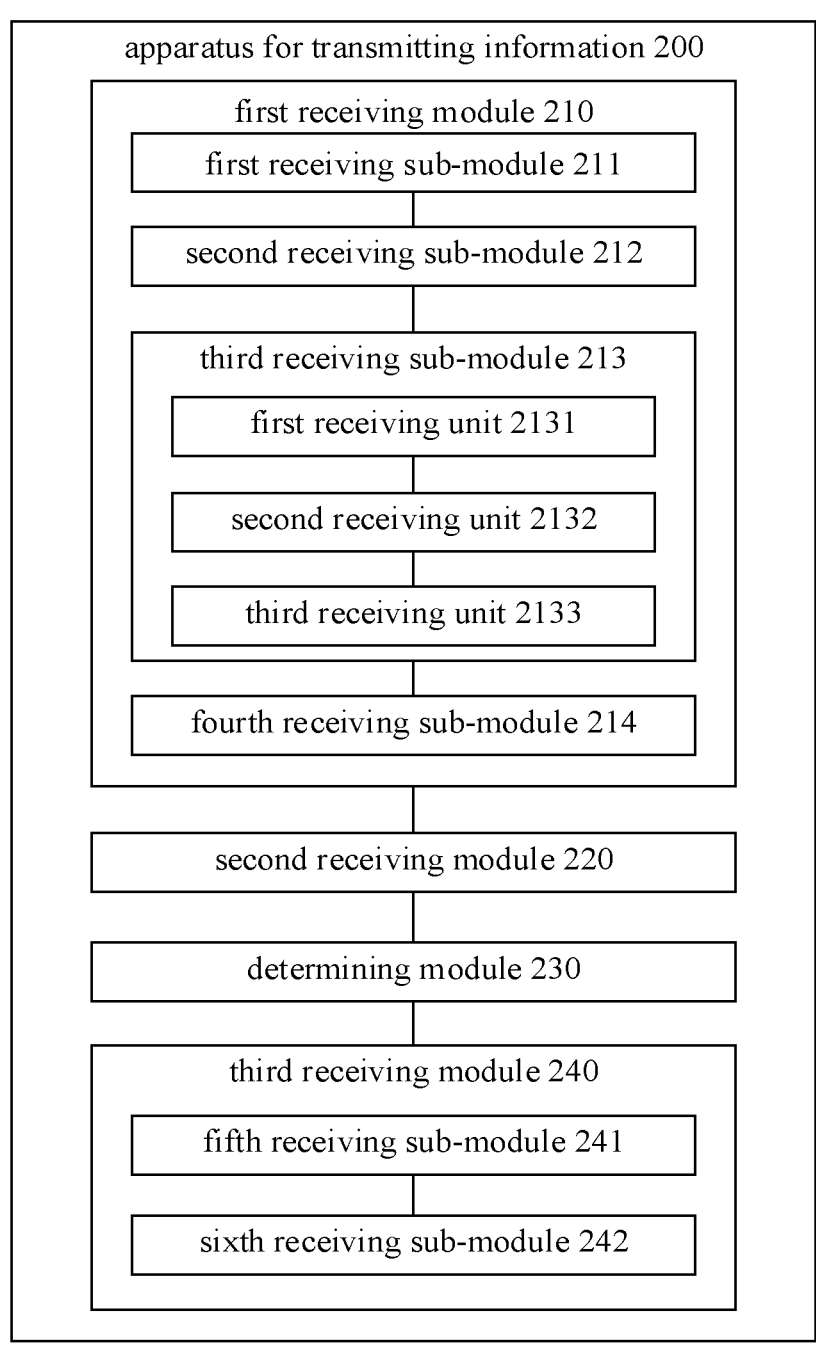
FIG. 5 is a block diagram of an apparatus for transmitting information according to another exemplary embodiment.

The embodiment of the disclosure also provides an apparatus for transmitting information, applicable to a UE for wireless communication. As illustrated in FIG. 5, the apparatus 200 includes: a first receiving module 210.

The first receiving module 210 is configured to, in response to a base station being configured with a shared TRS/CSI-RS at least for a UE in an idle state and/or a UE in an inactive state to receive, complete downlink synchronization and receive a PEI sent by the base station via the shared TRS/CSI-RS, in which the PEI is carried in DCI.

In an embodiment, the apparatus 200 further includes:

a second receiving module 220, configured to receive first indication information; and a determining module 230, configured to determine, based on the first indication information, whether to complete the downlink synchronization and receive the PEI sent by the base station via the shared TRS/CSI-RS.

In an embodiment, the first receiving module 210 includes at least one of:

a first receiving sub-module 211, configured to, in response to the first indication information indicating a first value, complete the downlink synchronization and receive the PEI sent by the base station via the shared TRS/CSI-RS; and a second receiving sub-module 212, configured to, in response to the first indication information indicating a second value, complete the downlink synchronization and receive the PEI sent by the base station via a SSB, in which the first value is different from the second value.

In an embodiment, the first receiving module 210 includes:

a third receiving sub-module 213, configured to complete the downlink synchronization and receive the PEI sent during a SSB cycle associated with the shared TRS/CSI-RS by the base station via the shared TRS/CSI-RS.

In an embodiment, the third receiving sub-module 213 includes at least one of:

a first receiving unit 2131, configured to receive the PEI during a SSB cycle to which the shared TRS/CSI-RS belongs; and a second receiving unit 2132, configured to receive the PEI during a SSB cycle that is at a preset distance from the shared TRS/CSI-RS in a time domain.

In an embodiment, the third receiving sub-module 213 includes:

a third receiving unit 2133, configured to, in response to the first indication information indicating a first value, receive the PEI sent during the SSB cycle associated with the shared TRS/CSI-RS by the base station.

In an embodiment, the apparatus 200 further includes:

a third receiving module 240, configured to receive configuration information carrying the first indication information and second indication information for indicating a transmission resource of the shared TRS/CSI-RS.

The first receiving module 210 includes:

a fourth receiving sub-module 214, configured to complete the downlink synchronization and receive the PEI sent by the base station via the shared TRS/CSI-RS transmitted by the transmission resource.

In an embodiment, the third receiving module 240 includes at least one of:

a fifth receiving sub-module 241, configured to receive a system message carrying the first indication information and the second indication information; and a sixth receiving sub-module 242, configured to receive a RRC message carrying the first indication information and the second indication information.

In an exemplary embodiment, the first sending module 110, the second sending module 120, the third sending module 130, the fourth sending module 140, the first receiving module 210, the second receiving module 220, the determining module 230 and the third receiving module 240, etc. may be implemented by one or more Central Processing Units (CPUs), Graphics Processing Units (GPUs), Baseband Processors (BP), Application Specific Integrated Circuits (ASICs), Digital Signal Processors (DSPs), Programmable Logic Devices (PLDs), Complex Programmable Logic Devices (CPLDs), Field-Programmable Gate Arrays (FP- GAs), general processors, controllers, Micro Controller Units (MCUs), microprocessors or other electronic components, for implementing the above methods.

Figure 6:
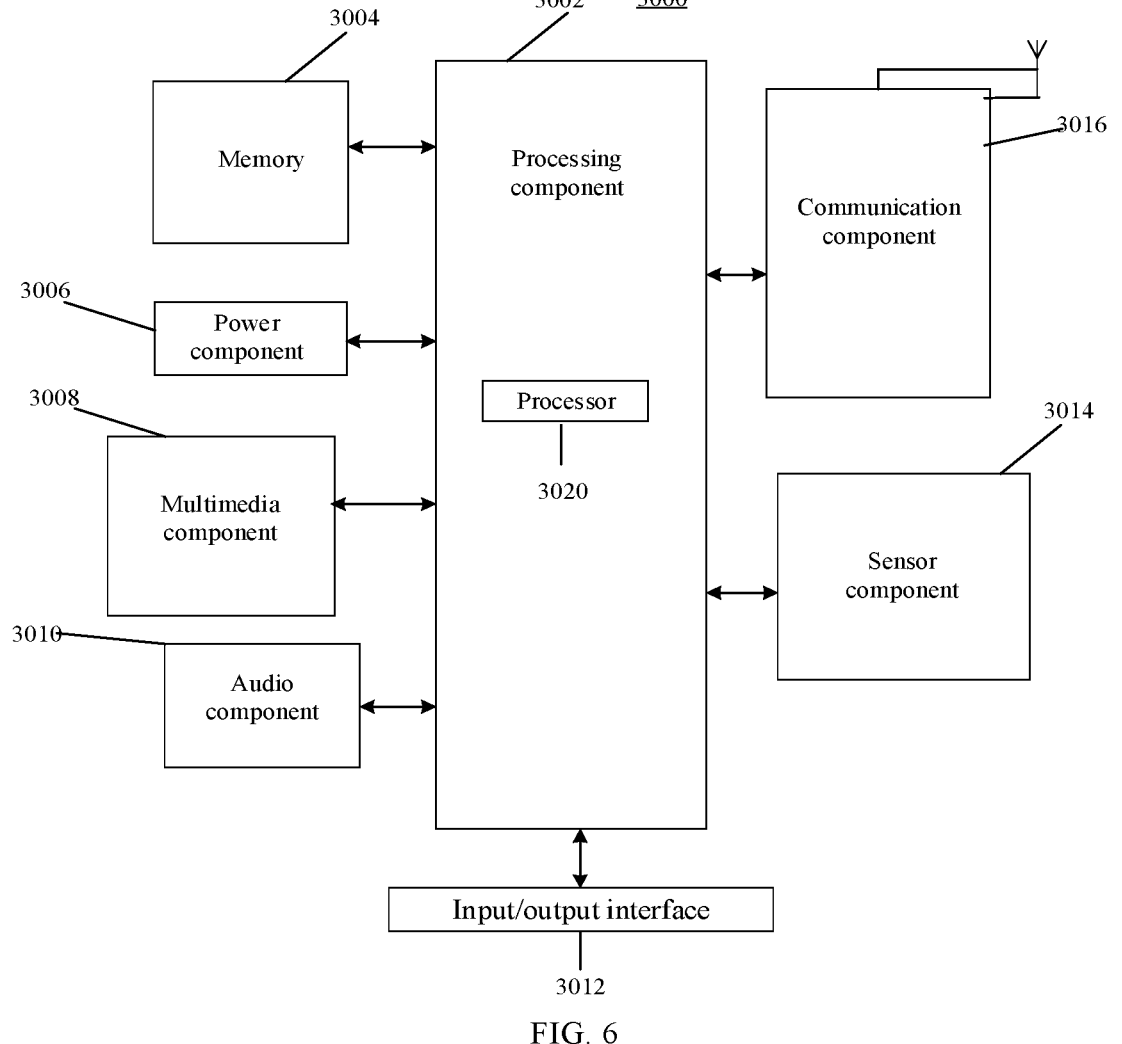
FIG. 6 is a block diagram of a device for transmitting information according to an exemplary embodiment.

FIG. 6 is a block diagram of a device 3000 for transmitting information according to an exemplary embodiment. For example, the device 3000 may be a mobile phone, a computer, a digital broadcasting terminal, a message transceiver device, a game console, a tablet device, a medical device, a fitness device and a personal digital assistant.

As illustrated in FIG. 6, the device 3000 may include at least one of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to implement all or part of the steps in the above described method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, or a combination thereof. In an exemplary embodiment, the communication component 3016 receives a broadcast signal or broadcast associated information from an external broadcast management system via a broadcast channel. In an exemplary embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium including executable instructions, such as the memory 3004. The above instructions may be executed by the processor 3020 in the device 3000, for performing the above methods. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for transmitting information, performed by a base station, comprising:
    sending a shared tracking reference signal (TRS)/channel state information-reference signal (CSI-RS), wherein the shared TRS/CSI-RS is at least configured for at least one of a user equipment (UE) in an idle state and a UE in an inactive state to complete downlink synchronization and receive a paging early indication (PEI), and the PEI is carried in downlink control information (DCI); and
    sending first indication information, wherein the first indication information is configured for the UE to determine whether to complete the downlink synchronization and receive the PEI via the shared TRS/CSI-RS;
    wherein:
    in response to the first indication information indicating a first value, the first indication information is configured to indicate the UE to complete the downlink synchronization and receive a PEI sent by the base station via the shared TRS/CSI-RS; and
    in response to the first indication information indicating a second value, the first indication information is configured to indicate the UE to complete the downlink synchronization and receive the PEI sent by the base station via a synchronization signal and physical broadcast channel block (SSB), wherein the first value is different from the second value.

2. The method of claim 1, further comprising:
    sending the PEI during a SSB cycle associated with the shared TRS/CSI-RS.

3. The method of claim 2, wherein sending the PEI during the SSB cycle associated with the shared TRS/CSI-RS comprises at least one of:
    sending the PEI during a SSB cycle to which the shared TRS/CSI-RS belongs; and
    sending the PEI during a SSB cycle that is at a preset distance from the shared TRS/CSI-RS in time domain.

4. The method of claim 1, further comprising:
    in response to the first indication information indicating a first value, sending the PEI during a SSB cycle associated with the shared TRS/CSI-RS.

5. The method of claim 1, further comprising:
    sending configuration information carrying the first indication information and second indication information for indicating a transmission resource of the shared TRS/CSI-RS.

6. The method of claim 5, wherein sending the configuration information carrying the first indication information and the second indication information for indicating the transmission resource of the shared TRS/CSI-RS, comprises at least one of:

sending a system message carrying the first indication information and the second indication information; and sending a radio resource control (RRC) message carrying the first indication information and the second indication information.

7. A method for transmitting information, performed by a user equipment (UE), comprising:

in response to a base station being configured with a shared tracking reference signal (TRS)/channel state information-reference signal (CSI-RS) for at least one of a UE in an idle state and a UE in an inactive state to receive, completing downlink synchronization and receiving a paging early indication (PEI) sent by the base station via the shared TRS/CSI-RS, wherein the PEI is carried in downlink control information (DCI);

receiving first indication information; and determining, based on the first indication information, whether to complete the downlink synchronization and receive the PEI sent by the base station via the shared TRS/CSI-RS;

wherein determining, based on the first indication information, whether to complete the downlink synchronization and receive the PEI sent by the base station via the shared TRS/CSI-RS, comprises at least one of:

in response to the first indication information indicating a first value, completing the downlink synchronization and receiving the PEI sent by the base station via the shared TRS/CSI-RS; and in response to the first indication information indicating a second value, completing the downlink synchronization and receiving the PEI sent by the base station via a synchronization signal and physical broadcast channel block (SSB), wherein the first value is different from the second value.

8. The method of claim 7, wherein completing the downlink synchronization and receiving the PEI sent by the base station via the shared TRS/CSI-RS, comprises:

completing the downlink synchronization and receiving the PEI sent during a SSB cycle associated with the shared TRS/CSI-RS by the base station via the shared TRS/CSI-RS.

9. The method of claim 8, wherein receiving the PEI sent during the SSB cycle associated with the shared TRS/CSI-RS by the base station comprises at least one of:

receiving the PEI during the SSB cycle to which the shared TRS/CSI-RS belongs; and receiving the PEI during the SSB cycle that is at a preset distance from the shared TRS/CSI-RS in a time domain.

10. The method of claim 7, further comprising:

in response to the first indication information indicating a first value, receiving the PEI sent during a SSB cycle associated with the shared TRS/CSI-RS by the base station.

11. The method of claim 7, further comprising:

receiving configuration information carrying the first indication information and second indication information for indicating a transmission resource of the shared TRS/CSI-RS; and completing the downlink synchronization and receiving the PEI sent by the base station via the shared TRS/CSI-RS, comprising:

completing the downlink synchronization and receiving the PEI sent by the base station via the shared TRS/CSI-RS transmitted by the transmission resource.

12. The method of claim 11, wherein receiving the configuration information carrying the first indication information and the second indication information for indicating the transmission resource of the shared TRS/CSI-RS, comprises at least one of:

receiving a system message carrying the first indication information and the second indication information; and receiving a radio resource control (RRC) message carrying the first indication information and the second indication information.

13. A communication device, comprising a processor, a memory and executable programs stored on the memory and capable of being run by the processor, wherein when the executable programs are executed by the processor, a method for transmitting information is implemented, the method comprises:

sending a shared tracking reference signal (TRS)/channel state information-reference signal (CSI-RS), wherein the shared TRS/CSI-RS is at least configured for at least one of a user equipment (UE) in an idle state and a UE in an inactive state to complete downlink synchronization and receive a paging early indication (PEI), and the PEI is carried in downlink control information (DCI); and sending first indication information, wherein the first indication information is configured for the UE to determine whether to complete the downlink synchronization and receive the PEI via the shared TRS/CSI-RS;

wherein:

in response to the first indication information indicating a first value, the first indication information is configured to indicate the UE to complete the downlink synchronization and receive a PEI sent by a base station via the shared TRS/CSI-RS; and in response to the first indication information indicating a second value, the first indication information is configured to indicate the UE to complete the downlink synchronization and receive the PEI sent by the base station via a synchronization signal and physical broadcast channel block (SSB), wherein the first value is different from the second value.

14. A non-transitory computer readable storage medium having executable programs stored thereon, wherein when the executable programs are executed by a processor, the method for transmitting information according to claim 1 is implemented.

15. A communication device, comprising a processor, a memory and executable programs stored on the memory and capable of being run by the processor, wherein when the executable programs are executed by the processor, the method for transmitting information according to claim 7 is implemented.

16. A non-transitory computer readable storage medium having executable programs stored thereon, wherein when the executable programs are executed by a processor, the method for transmitting information according to claim 7 is implemented.

\* \* \* \* \*